(12) United States Patent
Kim

(10) Patent No.: US 6,621,066 B2  
(45) Date of Patent: Sep. 16, 2003

(54) METHOD FOR OPTIMIZING OPENING AND CLOSING CONTROL OF A SUB-BODY IN AUTOMATIC AND MANUAL FOLDER TYPE MOBILE COMMUNICATION TERMINALS

(75) Inventor: Sang-Soon Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 32 days.

(21) Appl. No.: 10/047,128

(22) Filed: Jan. 15, 2002

(65) Prior Publication Data

US 2002/0113199 A1 Aug. 22, 2002

(30) Foreign Application Priority Data

Feb. 16, 2001 (KR) .......................................... 2001-7885

(51) Int. Cl.$^7$ .............................. H04M 1/02; H04B 1/00
(52) U.S. Cl. .......................................... 250/221; 455/90
(58) Field of Search ............................... 250/221, 222.1, 250/206, 206.1; 455/90, 575, 100, 550, 579

(56) References Cited

U.S. PATENT DOCUMENTS

| | | | | |
|---|---|---|---|---|
| 5,336,896 A | * | 8/1994 | Katz ........................ 250/515.1 |
| 5,418,836 A | * | 5/1995 | Yazaki ........................ 379/58 |
| 5,564,078 A | * | 10/1996 | Nagai ........................... 455/89 |
| 5,689,824 A | * | 11/1997 | Nagai ........................... 455/89 |
| 5,918,188 A | * | 6/1999 | Doran ......................... 455/575 |
| 5,991,638 A | * | 11/1999 | Kim et al. ................... 455/550 |
| 6,167,288 A | * | 12/2000 | Ishihara ...................... 455/566 |
| 6,256,481 B1 | * | 7/2001 | Jeong et al. ................... 455/90 |
| 6,373,006 B1 | * | 4/2002 | Toki ........................... 200/61.7 |
| 6,438,228 B1 | * | 8/2002 | Jeong et al. ............. 379/433.13 |
| 6,459,887 B2 | * | 10/2002 | Okuda ........................... 455/90 |
| 6,470,175 B1 | * | 10/2002 | Park et al. ..................... 455/90 |
| 2001/0044320 A1 | * | 11/2001 | Ono et al. .................... 455/550 |
| 2002/0022496 A1 | * | 2/2002 | Park ............................ 455/550 |
| 2002/0052228 A1 | * | 5/2002 | Ko .............................. 455/574 |
| 2002/0061733 A1 | * | 5/2002 | Wang ........................... 455/90 |
| 2002/0077161 A1 | * | 6/2002 | Eromaki ...................... 455/575 |
| 2002/0114448 A1 | * | 8/2002 | Kim et al. ............. 379/433.13 |
| 2002/0160727 A1 | * | 10/2002 | Won ............................. 455/90 |
| 2002/0183017 A1 | * | 12/2002 | Mujica .......................... 455/90 |
| 2003/0040288 A1 | * | 2/2003 | Kang et al. .................... 455/90 |
| 2003/0040330 A1 | * | 2/2003 | Kim et al. ................... 455/550 |

FOREIGN PATENT DOCUMENTS

JP 5336023 * 4/1992 ............ H04B/7/26

* cited by examiner

Primary Examiner—Diego Gutierrez  
Assistant Examiner—G. Verbitsky  
(74) Attorney, Agent, or Firm—Dilworth & Barrese, LLP

(57) ABSTRACT

A method for optimizing an automatic opening and closure control of a sub-body folder in a foldable mobile communication terminal provided with a main body, the sub-body, a sensor means for detecting a fully open or closed state of the sub-body, a sub-body opening/closing drive unit, and a current sensor. According to the method, a first motor driving current is measured before detection by the sensor means upon an opening or closing operation of the sub-body by the sub-body opening/closing drive unit, and then a second motor driving current is measured after detection by the sensor means upon the opening or closing operation. Then, an optimal current threshold value is determined based on the first and second motor driving currents measured to be taken as a reference value for anticipating an operational state of the motor.

11 Claims, 10 Drawing Sheets

METHOD FOR OPTIMIZING OPENING AND CLOSING CONTROL OF A SUB-BODY IN AUTOMATIC AND MANUAL FOLDER TYPE MOBILE COMMUNICATION TERMINALS

CLAIM OF PRIORITY

This application makes reference to, incorporates the same herein, and claims all benefits accruing under 35 U.S.C. §119 from an application entitled "A Method For Optimizing Control Of Sub-Body Opening/Closing In Automatically And Manually Folded Portable Mobile Terminal" filed in the Korean Industrial Property Office on Feb. 16, 2001 and thereby duly assigned Ser. No. 2001-7885.

BACKGROUND OF THE INVENTION

1. Field of the Invention

The present invention relates generally to a mobile communication terminal, and in particular, to a method for optimizing an opening and closing control of a sub-body in an automatically and manually foldable mobile communication terminal.

2. Description of the Related Art

A mobile radio terminal is a portable mobile station that provides radio communication services to its subscriber while wirelessly communicating with its base station. Mobile telephone terminals are generally classified into two types of terminals, i.e., a bar-type terminal and a foldable terminal. The bar-type terminal with its keypad exposed to the outside, has recently trended toward less popular use owing to its exposed keypad providing no protection against any careless use. On the other hand, the foldable terminal provided with a main body and a sub-body, which is foldably coupled to the main body so that it is designed to fully cover a keypad disposed on the main body, is gaining much more popularity for its compact size and good protection for its keypad.

Conventionally, the foldable terminals are classified into a flip-type terminal, a flip-up-type terminal and a folder-type terminal. The flip-type terminal has a flip cover that serves as a sub-body for protecting the keypad mounted on a main body and concentrating a user's voice into a microphone mounted on the main body. The flip-up-type terminal is analogous to that of the flip-type in appearance, but further featured by a flip cover capable of opening up toward the upper side of the main body. The folder-type terminal has at least one display assembly consisting of one or more Liquid Crystal Display (LCD) modules mounted on either an inside or an outside, or both, of the sub-body other than a main body of the foldable terminal.

In recent years, the need of customers for a more convenient portable terminal has given rise to a so-called automatic foldable terminal designed so as to open and close the sub-body (usually referred to as "folder") automatically as well as manually, for example, by means of driving a folder motor disposed inside the terminal. Therefore, it is noted that such an automatic foldable terminal most requires a more efficient and precise control of driving the motor for opening or closing the sub-body folder upon using of the terminal. Further, a method for optimizing an opening and closing control of the folder has been required in the state of the art.

SUMMARY OF THE INVENTION

It is, therefore, an object of the present invention to provide a method for making an optimized control of automatic opening and closing of a sub-body (folder) in an automatic foldable mobile communication terminal.

To achieve the above and other objects of the present invention, there is provided a method for optimizing an automatic opening and closure control of a sub-body folder in a foldable mobile communication terminal having a main body, the sub-body foldably mounted on the main body, a sensor means for detecting a fully open or closed state of the sub-body with respect to the main-body, a sub-body opening/closing drive unit including therein a motor, and a current sensor for detecting an amount of motor driving current applied to the drive motor, the method including the steps of:

measuring a first motor driving current detected by the current sensor before detection by the sensor means upon an opening or closing operation of the sub-body by the sub-body opening/closing drive unit, and a second motor driving current detected by the current sensor after detection by the sensor means upon an opening or closing operation of the sub-body by the sub-body opening/closing drive unit; and determining an optimal current threshold value to be taken as a reference value for anticipating an operational state of the motor, on basis of the first and second motor driving currents measured, and applying the current threshold value to the foldable mobile communication terminal.

According to another aspect of the present invention, there is provided a method for optimizing an automatic opening and closure control of a sub-body folder in a foldable mobile communication terminal having a main body, the sub-body foldably mounted on the main body, a sensor means for detecting a fully open or closed state of the sub-body with respect to the main-body, and a sub-body opening/closing drive unit including therein a motor, the method including the steps of measuring a first motor driving current applied to the motor on an automatic opening or closing operation of the sub-body by the sub-body opening/closing drive unit upon receipt of an instruction for starting a self-diagnosis operation from a user;

if the sensor means detects either one of the fully open and closed positions of the sub-body, determining as a first current value a representative one of current values measured before detection by the sensor means;

measuring a second motor driving current applied to the motor on an automatic opening or closing operation of the sub-body by the sub-body opening/closing drive unit for a predetermined time duration after detection of the sensor means;

determining as a second current value a representative one of current values measured after detection by the sensor means; and determining an optimal current threshold value to be taken as a reference value for anticipating an operational state of the motor, on basis of the first and second current values, so as to thereby apply the current threshold value to the foldable mobile communication terminal.

According to still another aspect of the present invention, the method preferably includes the steps of:

measuring a motor driving current applied to the motor on an automatic opening or closing operation of the sub-body by the sub-body opening/closing drive unit upon receipt of an instruction for starting a self-diagnosis operation from a user;

if the sensor means detects either one of the fully open and closed positions of the sub-body, determining as a first current value either one of the highest three or more values of the current amounts measured before detection by the sensor means;

measuring a motor driving current applied to the motor on an automatic opening or closing operation of the sub-body by the sub-body opening/closing drive unit for a predetermined time duration after detection of the sensor means;

determining as a second current value either one of the highest three or more values of the current amounts measured after detection by the sensor means; and determining an optimal current threshold value from an intermediate value between the first and second current values, the current threshold value being usable as a reference value for anticipating an operational state of the motor, so as to thereby apply the determined current threshold value to the foldable mobile communication terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
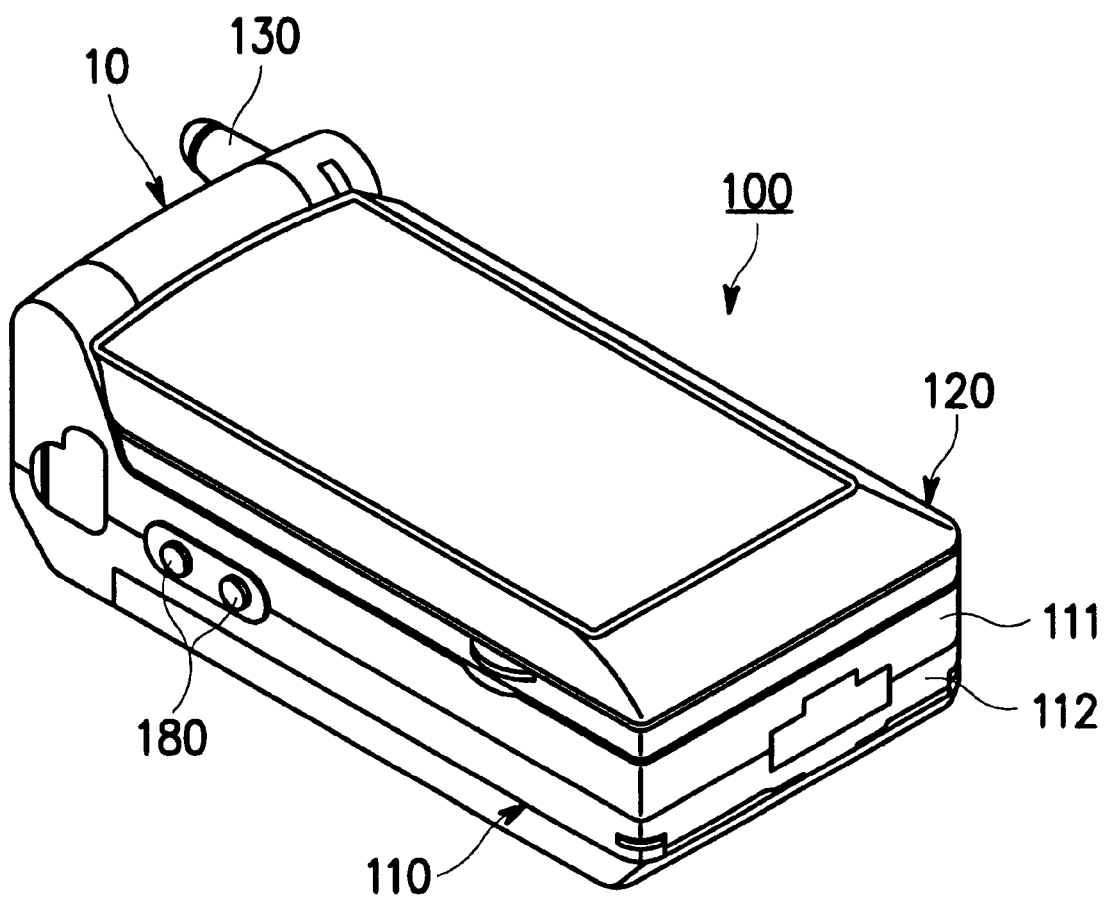
FIG. 1A is a perspective view illustrating a foldable mobile terminal according to a preferred embodiment of the present invention with its sub-body folded.

A preferred embodiment of the present invention will be described hereinafter with reference to the accompanying drawings. In the following description, well-known functions or constructions are not described in detail since they would obscure the invention in unnecessary detail and like reference numerals are intended to represent like components. Further, it should be noted that the present invention may be applied to any folder type of mobile communication terminals provided with an automatic opening/closing function of a sub-body foldably mounted onto a main-body. Although the present invention mostly discloses by way of a preferred embodiment the operation of an opening/closing drive unit applicable to a folder-type mobile terminal, it would be apparent to a person skilled in the art that the opening/closing drive unit as disclosed hereinafter may be also applicable to other types of foldable mobile communication terminals without departing the spirit of the invention.

Figure 1B:
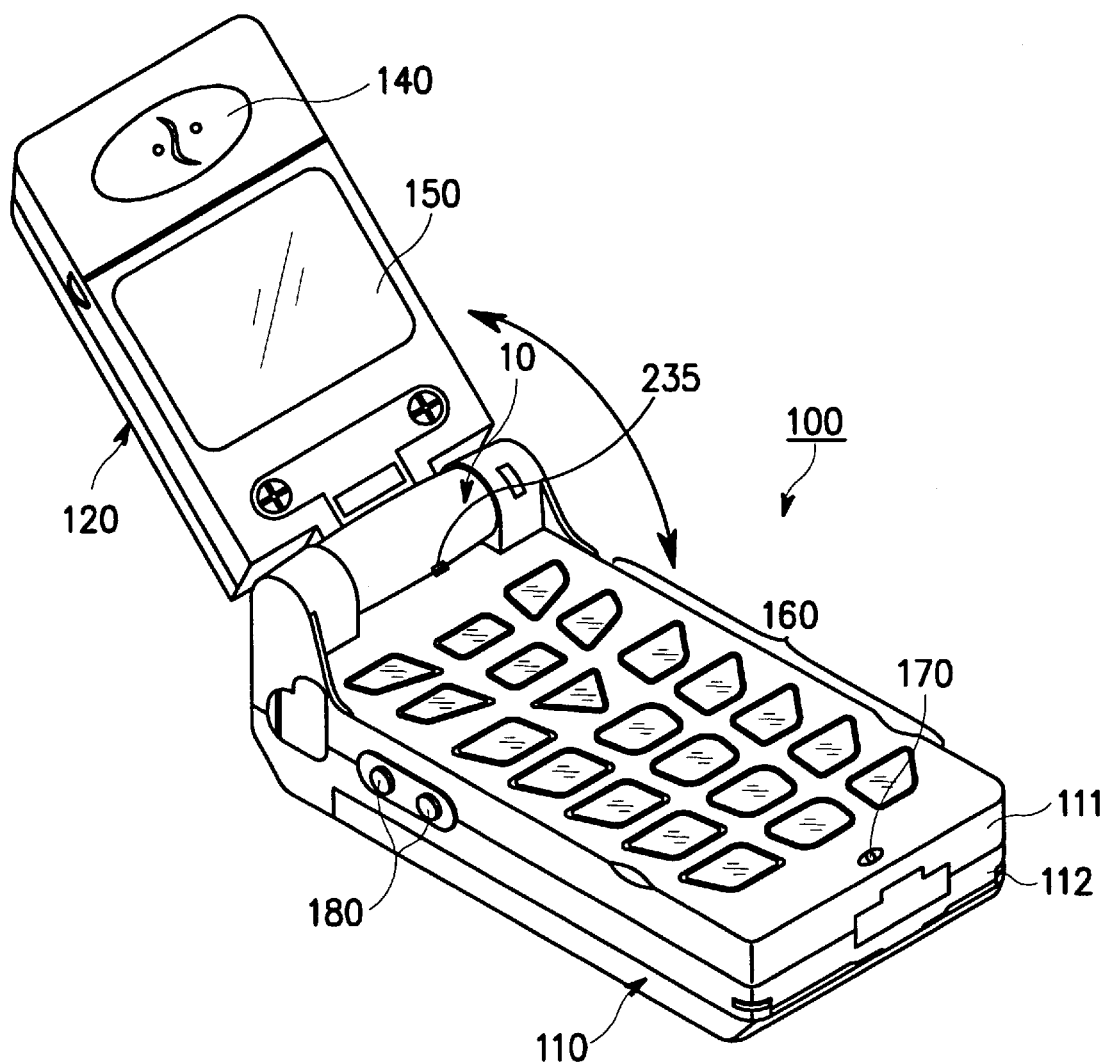
FIG. 1B is a perspective view illustrating the foldable mobile terminal according to a preferred embodiment of the present invention with the sub-body unfolded.

FIG. 1A shows a perspective view of a folder-type mobile terminal 100 with its sub-body folded onto a main-body, while FIG. 1B shows a similar perspective view of the folder-type mobile terminal 100 with the sub-body unfolded from the main-body. Referring now to FIGS. 1A and 1B, the folder-type (foldable) mobile terminal 100 includes a main body 110 having an upper casing frame 111 and a lower casing frame 112, and a sub-body 120 for protecting a keypad 160 mounted on the main body 110. An opening/closure drive unit 10 for opening or closing the sub-body 120 automatically or manually as per a user's selection is disposed in an upper side of the main-body 110. Further, the main body 110 is provided with an antenna device 130 mounted on a selected upper edge. The sub-body 120 coupled at its lower end to the main body 110 has an earpiece 140 preferably disposed on its upper part, and an LCD module 150 for a display internally disposed at the lower part of the earpiece 140. The main body 110 is provided with the keypad 160 and a microphone 170 mounted thereon. Further, an automatic folder opening/closure switch 180 for opening or closing the sub-body 120 is provided on a selected side end of the main-body 110. The opening/closure drive unit 10 drives to open or close the sub-body on the main-body as a user selects a desired folder operation in automatic or manual by means of the automatic folder opening/closure switch 180. An opening sensor and a closure sensor used for sensing full opening and full closing of the sub-body are respectively disposed in a location indicated by a reference numeral 235 or preferably in its vicinity on the opening/closure drive unit 10 of the main-body.

Figure 2:
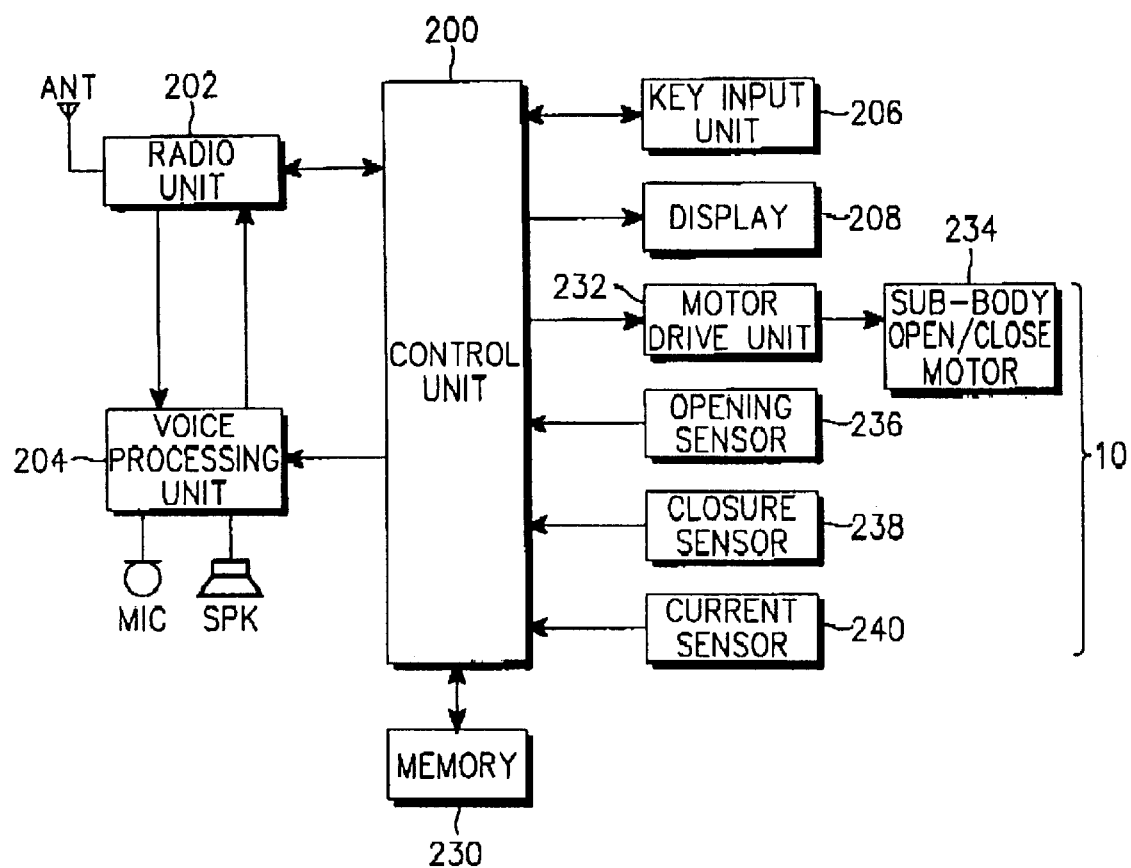
FIG. 2 is a schematic block diagram showing electrical construction of the foldable mobile terminal according to a preferred embodiment of the present invention.

Referring now to FIG. 2, a schematic electrical construction of the foldable mobile terminal 100 according to a preferred embodiment of the present invention is described in more detail. First of all, a control unit 200 serves to direct and perform overall control operations of the mobile terminal 100. A radio unit 202 coupled to the control unit 200 serves to control transmission and reception of voice data as well as various communication control data through an antenna ANT under control of the control unit 200. A voice processing unit 204 serves to convert the voice data received from the radio unit 202 to audible sound through a speaker SPK, and it also serves to convert a voice signal received from a microphone MIC to radio data so that the converted radio data is provided to the radio unit 202 for transmission, under the control of the control unit 200. A key input unit 206 connected to the control unit 200 is designed to be provided with a set of numeral and character keys and various function keys disposed on the keypad 106, as shown in FIGS. 1A and 1B, and further provided with an automatic folder opening/closure switch 180 arranged on one side of the mainbody 110. The key input unit 206 supplies to the control unit a respective key data corresponding to a key depressed by a user of the mobile terminal. A display unit 208 serves to display thereon various messages for the user under control of the control unit. A memory unit 230 connected the control unit is preferably designed to have a program memory for storing a set of system, operating programs and control data provided by a manufacturer, required to control the entire functions and operations of the mobile terminal, and a data memory for storing various user data temporarily generated during a use of the mobile terminal by a user or upon a system control. The opening/closure drive unit 10 of FIGS. 1B and 2 includes a motor drive 232, an opening sensor 236, a closure sensor 238, a sub-body open/close motor 234 and a current sensor 240.

Figure 3:
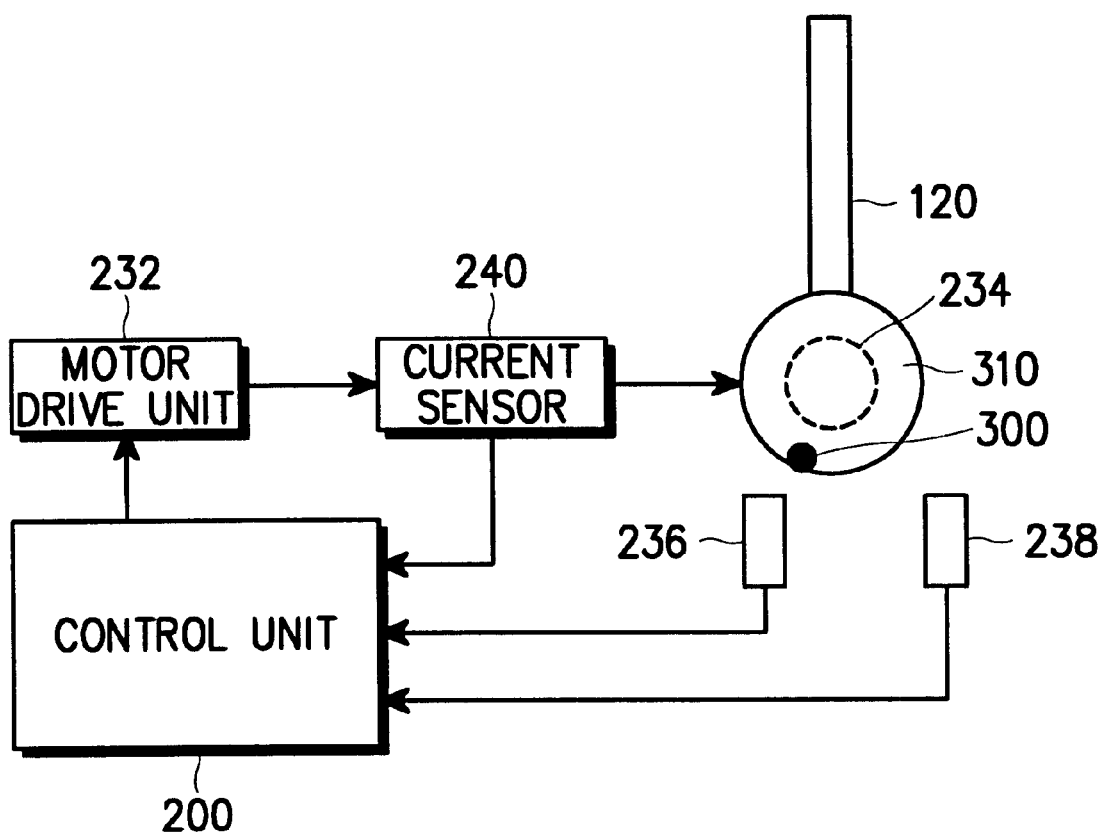
FIG. 3 is a more detailed schematic block diagram of the sub-body opening and closing control assembly of FIG. 2 in the foldable mobile terminal of the present invention.

Referring now to FIG. 3, a more detailed schematic bock diagram of a sub-body opening and closure drive unit 10 of the foldable mobile terminal according to a preferred embodiment of the present invention is explained. Further, FIG. 4 illustrates a sensible range 400 of the opening sensor 236 upon opening of the sub-body in the foldable mobile terminal, and the arrangement of the opening sensor 236 and the closure sensor 238 according to the preferred embodiment of the present invention.

The motor drive 232 receives electric power from a battery of the mobile terminal and serves to drive the sub-body open/close motor 234 positioned inside a hinge 310 coupled with one end of the sub-body in a clockwise or counterclockwise direction under the control of the control unit 200. A magnet 300 for the opening sensor 236 is mounted onto a peripheral end of the hinge 310 of the sub-body opening/closure drive unit 10, and the opening sensor 236 is arranged beneath one side of a printed circuit board 410 adjacent to the hinge 310, the printed circuit board being inserted inside the main-body 110. Another magnet 302 for the closure sensor 238 is mounted on an inner surface of an upper plate of the sub-body 120, so that the magnet 302 is placed in a face-to-face arrangement to the closure sensor 238 in a closed position of the sub-body, in which the closure sensor 238 is disposed on an upper side of the printed circuit board 410, spaced apart from the hinge 310. Accordingly, when the sub-body 120 is fully open, the opening sensor 236 is adapted to be located in a closely adjacent position to the magnet 300 for the opening sensor, as shown in FIG. 4, thereby outputting an open sensing signal corresponding to a fully open status of the sub-body. However, when the sub-body 120 is fully closed onto the main-body, the closure sensor 238 is adapted to be located in a closely adjacent position to the magnet 302 for the closure sensor, thereby outputting a closure sensing signal corresponding to a fully closed status of the sub-body, to the control unit 200. The opening sensor 236 and the closure sensor 238 are preferably of a kind of hall sensor. The sub-body opening and closure drive unit 10 is provided with a current sensor 240, which serves to sense a motor drive current applied to the sub-body open/close motor 234 from the motor drive unit 232 and to supply the sensed current to the control unit 200.

Figure 4:
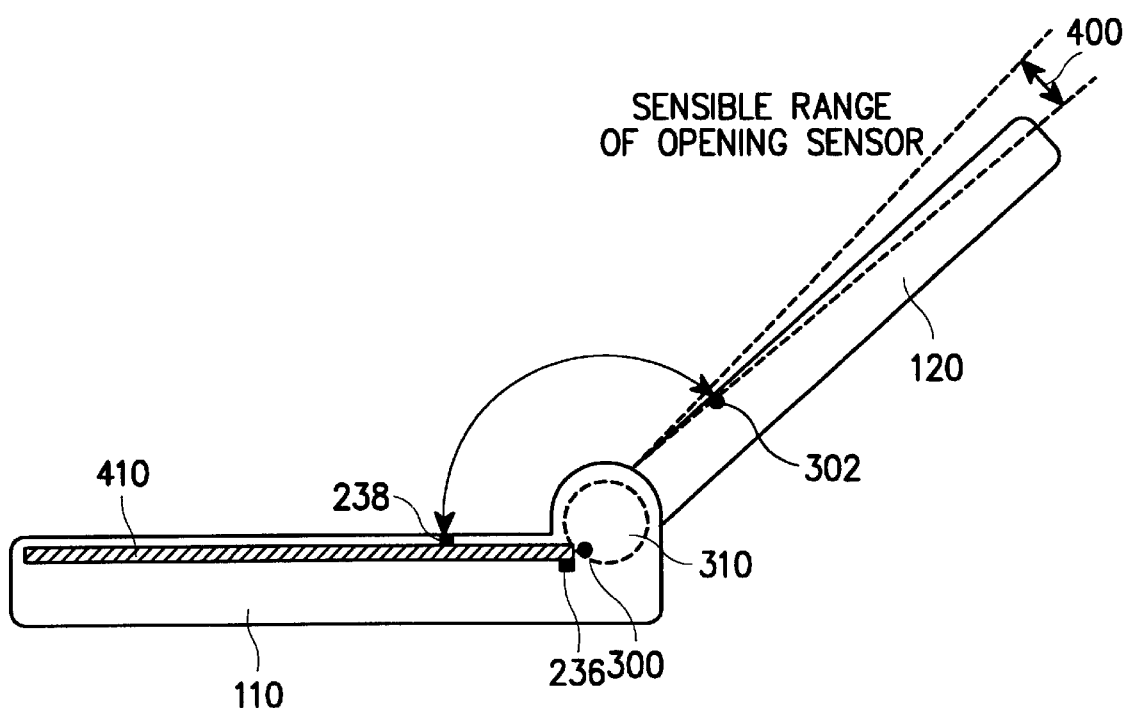
FIG. 4 is a schematic view illustrating a sensible range of an opening sensor upon opening of a sub-body in the foldable mobile terminal according to a preferred embodiment of the present invention.

Referring to FIG. 4, it is shown a sensible range 400 of the opening sensor 236 upon opening of the sub-body out of the main-body in the foldable mobile terminal, within which range the opening sensor 236 can sense the magnet 300 correctly, but beyond which range the opening sensor cannot sense the magnet 300 accurately. The provision of such a sensible range is apt to mean that the control unit 200 cannot make an accurate control of fully open position of the sub-body 120. Although FIG. 4 illustrates the sensible range of the opening sensor 236 only upon opening of the sub-body, it should be noted that a sensible range of the closure sensor 238 also may exist likewise.

Figure 5:
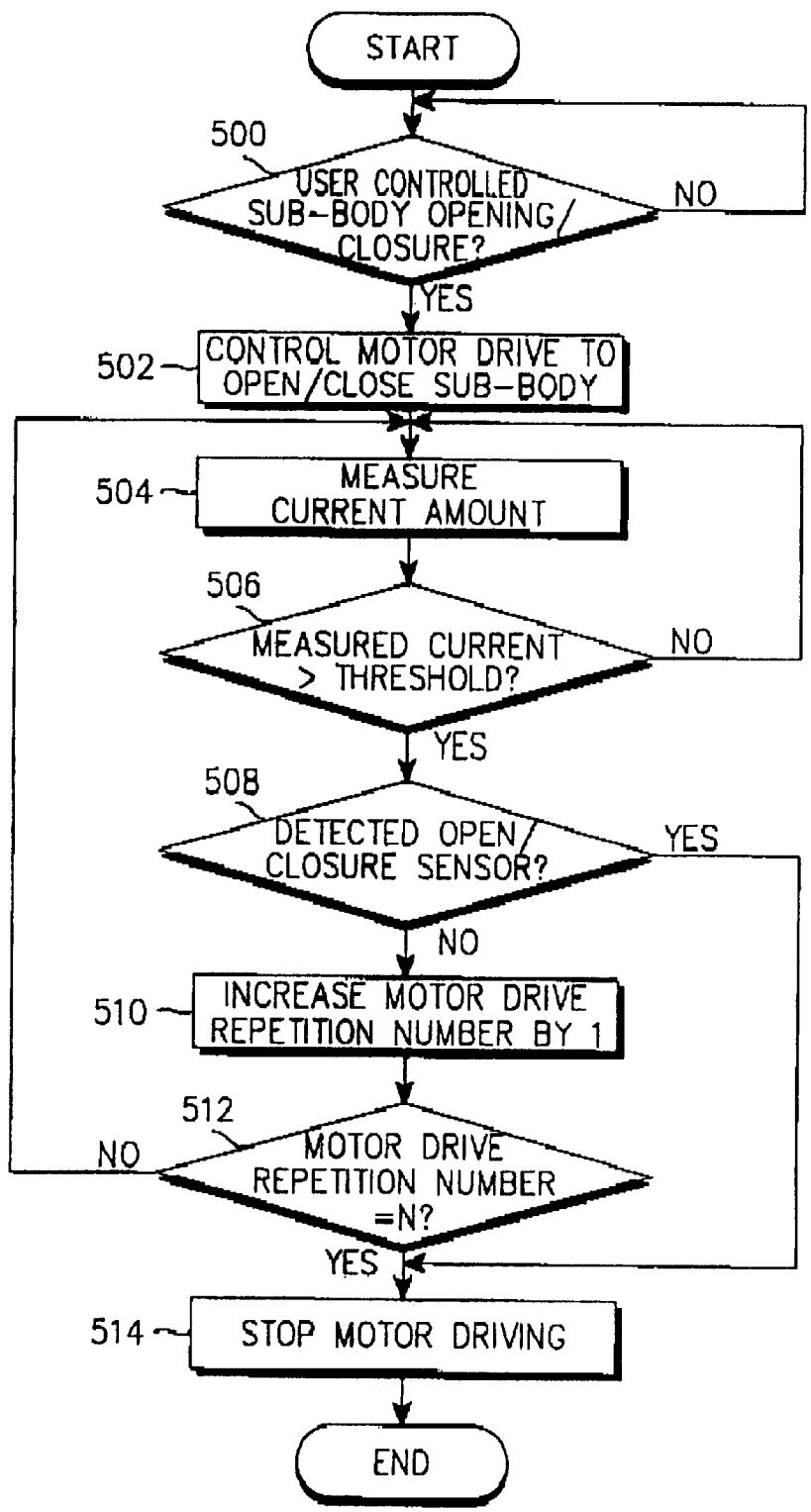
FIG. 5 is a flow chart illustrating a control procedure for automatic opening and closing of a sub-body in the foldable mobile terminal according to a preferred embodiment of the present invention.

Referring now to FIG. 5, it is shown a flow chart of a control procedure for automatically opening and closing the sub-body 120 in the foldable mobile terminal according to the preferred embodiment of the present invention. The control unit 200 performs the control procedure to make a precise control of a stopping position of the opening and closure of the sub-body. Hereinafter, operation of the control procedure of the present invention will be described in more detail with reference to the aforementioned drawings.

Assuming that a user of the foldable mobile terminal initially performs a manipulation of automatic opening/closure of a sub-body 120 by depressing the automatic folder opening/closure switch 180, the control unit 200 receives predetermined key data corresponding to the depressed switch 180, so that it is recognized as a control of automatic opening or closure of the sub-body 120 in step 500 as shown in FIG. 5. Then, in step 502, the control unit 200 performs a motor drive control for a given time so as to open or close the sub-body 120 from or onto the main-body 110. That is, the control unit 200 makes a control of the motor drive 232 to have the sub-body open/close motor 234 rotate either in a clockwise direction to open the sub-body or in a counterclockwise direction to close the sub-body. In step 504, the control unit 200 periodically makes a measurement of motor driving current sensed by the current sensor 240 for a predetermined period, for instance, every 30 milliseconds (msec), and then motor driving current measurement is converted into a corresponding value of current code by an analog-to-digital converter (not shown) internally installed within the control unit so that the converted current value can be further processed in the control unit.

Figure 6:
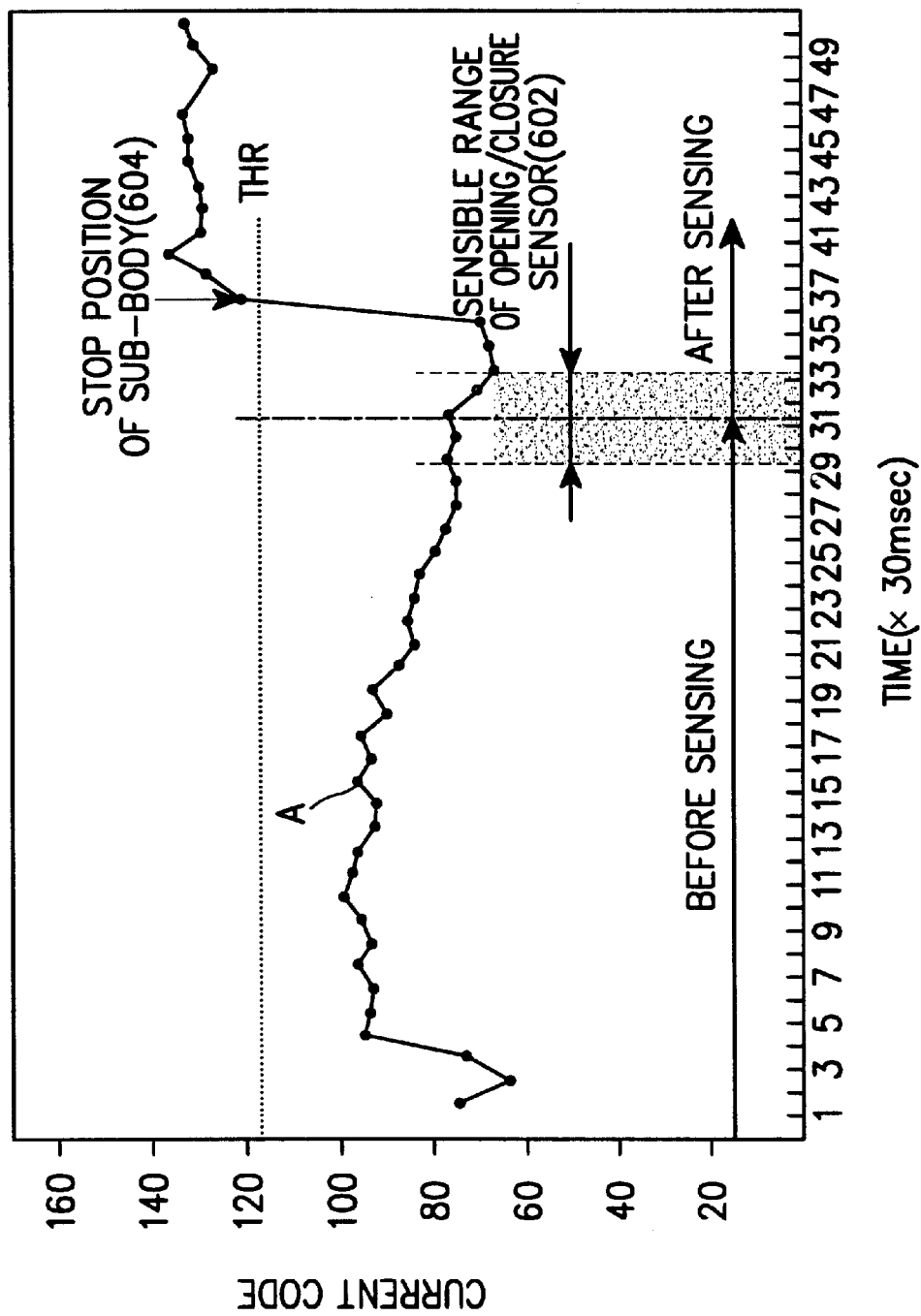
FIG. 6 is a graphic diagram illustrating stopping positions of a sub-body upon its opening/closure in the foldable mobile terminal according to a preferred embodiment of the present invention.

Referring now to FIG. 6, stopping positions of the sub-body 120 upon its opening/closure in the foldable mobile terminal according to the preferred embodiment of the present invention are graphically shown, in which a curved line A represents a profile of the current code values measured by the control unit 200 in 30 msec intervals, a threshold value THR represents a given reference value used for anticipating a status of motor operation, and a reference numeral 602 represents a sensing range capable of detecting the magnets 300, 302 by the opening sensor 236 and the closure sensor 238.

Referring back to FIG. 5, in step 506, the control unit makes a control to determine whether the measured current code value is more than a predetermined current threshold value THR, in which current code values more than the current threshold value THR will stand for an overloaded state of the sub-body open/close motor 234. Such an overload status on the motor 234 may be caused by any physical obstruction against a smooth movement during opening or closing of the sub-body, a fully open situation of the sub-body, or a fully closed situation thereof. Hence, if the measured current code is larger than the predetermined current threshold value THR, then the control proceeds to step 508 to determine whether the opening sensor 236 or the closure sensor 238 has sensed the magnet 300 or 302, respectively. In the step 508, when the opening sensor 236 or the closure sensor 238 has sensed the magnet 300 or 302, that is to say, when the previous two decision steps 506 and 508 are answered "YES", then the control of the control unit 200 proceeds to step 514 to disable driving the sub-body open/close motor 234 immediately.

A position 604 as seen in FIG. 6 represents the very position of meeting all the decision conditions (for instance, answered "YES") on the above two steps 506 and 508. It should be noted that this position 604 will not be formed in a certain range but at one point of location, as illustrated in FIG. 6, which in fact will lead to a conclusion that an opening or closing position of the sub-body 120 can be controlled properly and precisely.

In step 508, when the opening sensor 236 or the closure sensor 238 has not sensed the magnets 300, 302, that is, answered "NO", then the control proceeds to step 510 to increase a number of motor driving repetition by "1" from an initial value "0" for driving the sub-body open/close motor 234 further. This situation usually occurs when a smooth movement of the sub-body is physically interfered by any outside obstruction during its opening or closing. Preferably, a counter to count the number of motor driving repetition may be provided to the control unit or in association with the control unit internally or externally Then, the control unit 200 determines in step 512 whether or not the number of motor driving repetition counted reaches a predetermined natural number "N", so that if the counted number has not still reached the number "N", then the control proceeds to the previous step 504 to repeat the aforementioned similar operations. However, if the counted number has reached the number "N", then the control proceeds to step 514 to discontinue driving the sub-body open/close motor 234 immediately.

As described in the foregoing, the foldable mobile terminal according to the present invention operates to detect a change of the motor driving current applied to the sub-body open/close motor 234 from the current sensor 240, thereby enabling or disabling driving the motor 234 responsive to the detected change, so as to position the sub-body 120 to a desired target location correctly. In doing so, one of the most important factors would be a current threshold value THR as shown in FIG. 6, wherein the current threshold value THR is a kind of reference values provided for anticipating an operational state of the motor. If a level of the motor driving current for driving the sub-body open/close motor 234 increases more than the current threshold value THR, it will mean that the motor 234 is getting overloaded, which in other words, will most probably indicate that the normal operation of the motor 234 is now being interfered with other physical factors.

Figure 7:
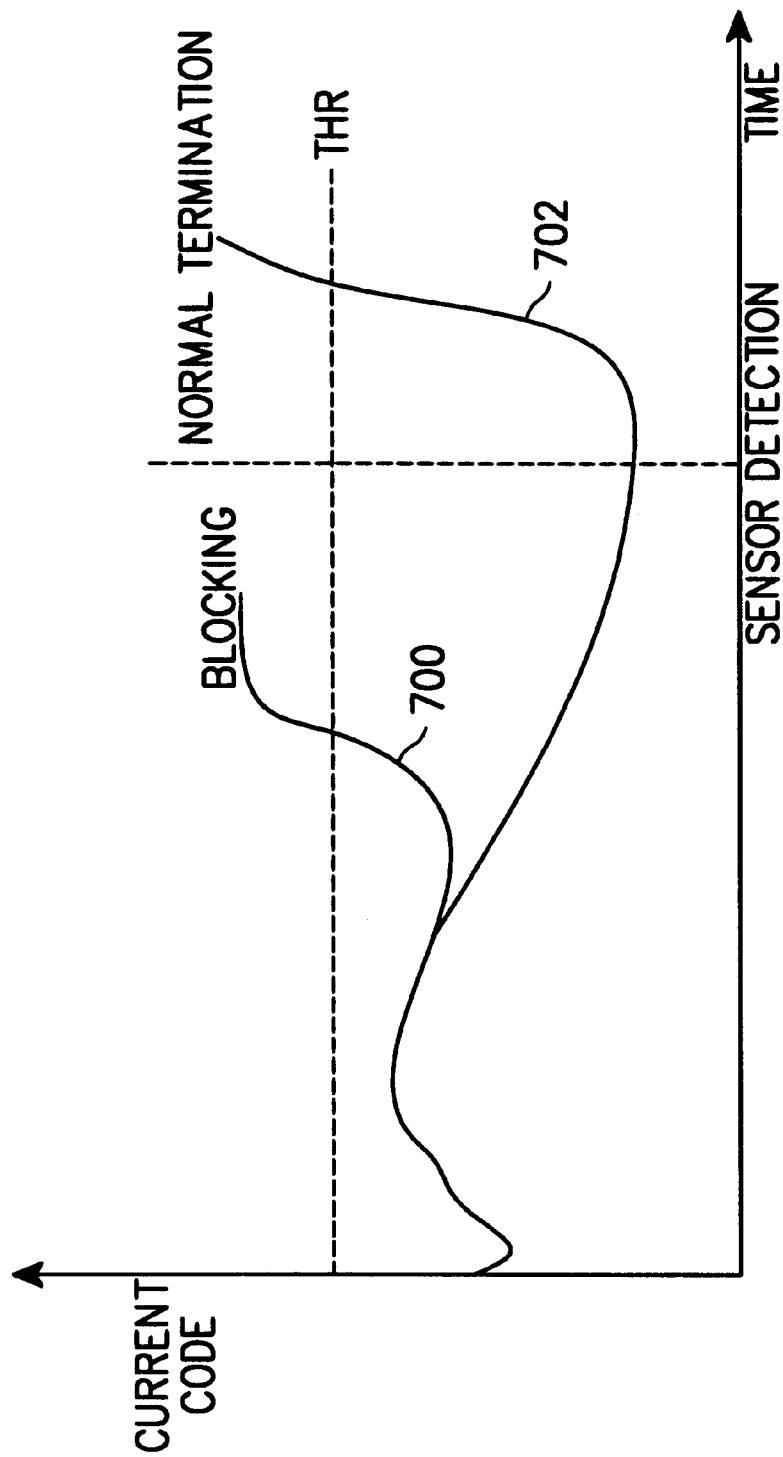
FIG. 7 is a graphic diagram of two current profiles each representing a normal operation of opening/closing of a sub-body and an obstructed status of opening/closing of the sub-body in the foldable mobile terminal according to a preferred embodiment of the present invention.

Referring now to FIG. 7, explained in detail are two current profiles each representing a normal operation (in curve 702) of opening/closing of the sub-body 120 and an abnormal or obstructed state (in curve 700) of opening/closing of the sub-body in the foldable mobile terminal. As seen in the curve 702 representative of the normal operation of the sub-body, a current code value corresponding to the level of the detected motor driving current is kept lower than the threshold value THR till the sub-body normally passes through a position of the opening sensor 236 and the closure sensor 238 from its initial opening or closure position, whereas the current code value will increase more than the threshold value THR at the moment that the sub-body has been fully opened to reach an obstructed position. In the meanwhile, the current profile of curve 700 substantially corresponds to the similar current profile line indicated by a reference numeral A in FIG. 6. As seen in this profile curve 700, the current code value corresponding to the level of the detected motor driving current will abruptly increase much more than the threshold value THR when any physical obstruction to operation of the sub-body is caused before it is fully opened or closed, that is to say, before passing through the position of the opening sensor 236 and the closure sensor 238 from its initial position.

As described with reference to the drawings of FIGS. 6 and 7, it is very essential to the present invention to determine the above-mentioned current threshold value THR in the most preferable level, because if the value THR is set improperly or inadequately then the precise control of the sub-body operation can not be carried out in the present invention. For example, such an improper THR value will mostly cause the sub-body to be incompletely (not fully) opened or closed, stopping the motor 234 on the way of its driving.

It should be appreciated that the aforementioned current threshold value THR practically required to the respective mobile terminals will be subject to a small degree of change or fluctuation even though the foldable mobile terminals are designed with the identical circuit construction and physical measurements by a manufacturer. In particular, the optimal value of the current threshold value THR suited to a respective terminal set manufactured may be slightly different from each other, terminal by terminal, and in some instances, they may be quite different from each other depending upon the characteristic of each terminal. Under this circumstance, it would be not advantageous for the foldable mobile terminals to apply an identical current threshold value to all the terminal sets. Furthermore, it would not be convenient for the manufacture to determine the current threshold value most suited to each terminal set one by one and then apply the value to each terminal set.

Accordingly, the preferred embodiment of the present invention to be explained hereinafter provides a self-diagnosis solution for determining the optimized current threshold value suited to a respective terminal and for applying the determined value to the terminal.

Figure 8:
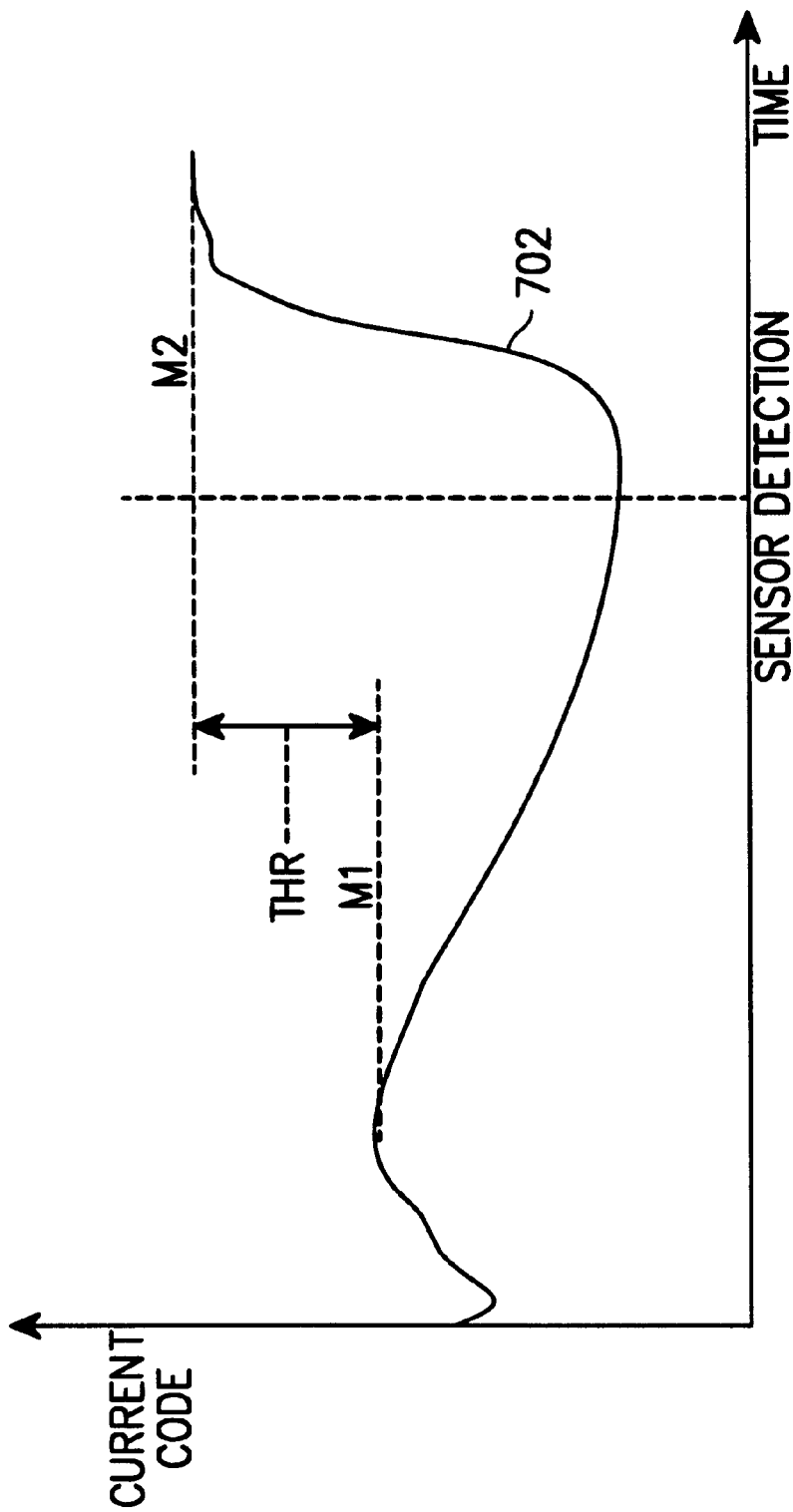
FIG. 8 is a graphic diagram of current characteristic for explaining a method of seeking a current threshold value in the foldable mobile terminal according to a preferred embodiment of the present invention.
Figure 9:
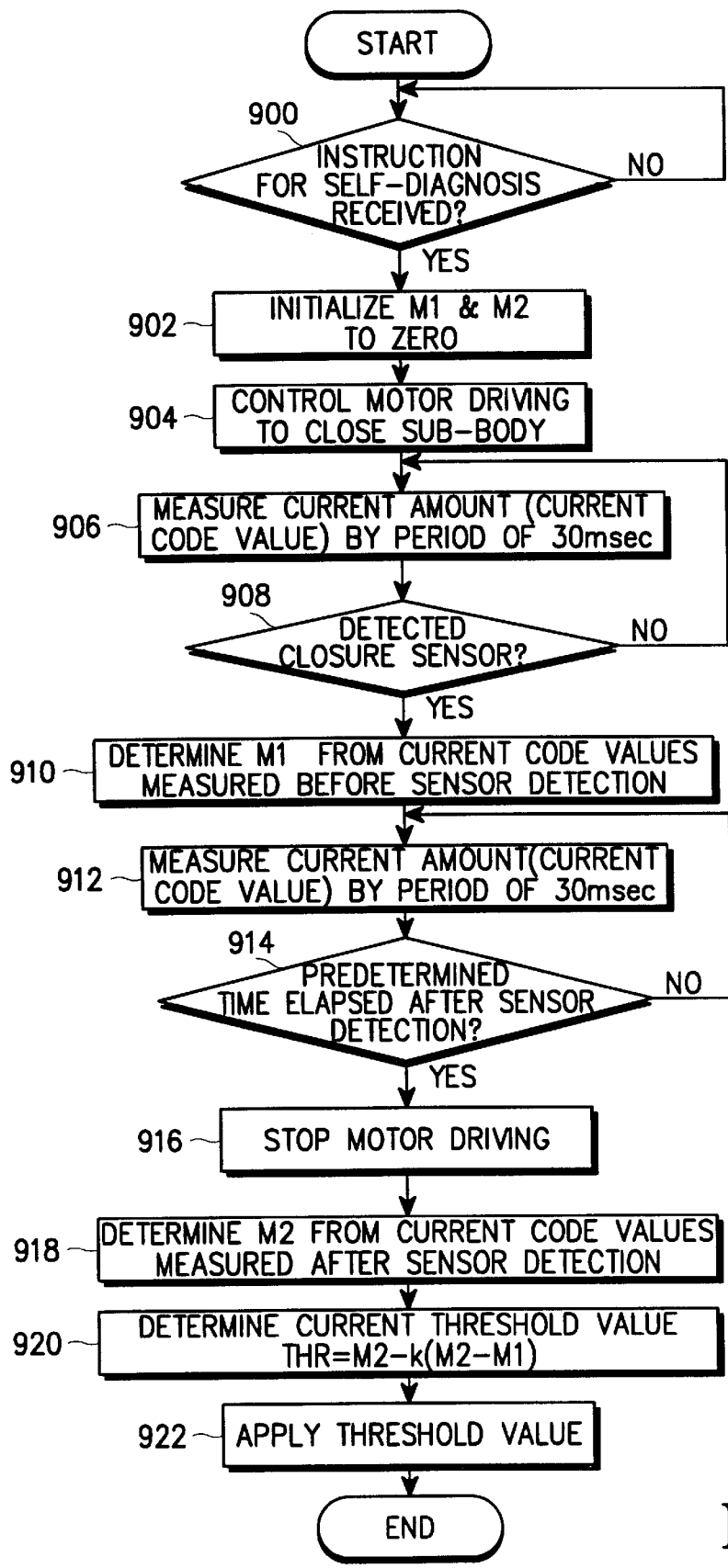
FIG. 9 is a flow chart diagram illustrating a control procedure for making an optimized control of the sub-body opening/closure operation in the foldable mobile terminal according to a preferred embodiment of the present invention.

FIG. 8 shows a graphic diagram of current characteristics for explaining a method of determining a current threshold value in the foldable mobile terminal according to the preferred embodiment of the present invention, and FIG. 9 shows a flow chart diagram illustrating a control procedure for making an optimized control of the sub-body opening/closure operation in the foldable mobile terminal according to the preferred embodiment of the present invention.

Referring back to FIG. 8, to carry out the optimized control of the sub-body opening/closure operation in the foldable mobile terminal, the invention determines a highest current value M1 before a sensor detection and then a highest current value M2 after the sensor detection, and thereby determines as a current threshold value THR an appropriate value in between M1 and M2 for application to the terminal.

Referring now to FIG. 9, once a user has given an instruction for starting the self-diagnosis procedure by using the key input unit 206 with the sub-body opened, a control unit 200 acknowledges the instruction in step 900 and then controls to proceed to a next step 902. It should be appreciated that the same instruction for starting the self-diagnosis procedure may be given with the sub-body fully closed. For example, the former case, in which the instruction for starting the self-diagnosis is given with the sub-body fully opened, would be the case when a user or a service provider gives the instruction manually by utilizing the key input unit 206 of the terminal, while the latter case in which the instruction for starting the self-diagnosis is given with the sub-body fully closed, would be most probably be the case when a manufacturer gives the instruction by using a data cable connectable to the terminal equipment on a manufacturing line.

Returning back to the flow chart of FIG. 9, the control unit 200 proceeds to step 902, in which variables M1 and M2 are initialized to zero, wherein M1 represents a highest current value before a sensor detection by the opening sensor and the closure sensor and M2 represents a highest current value after the sensor detection. Thereafter, the control unit 200 proceeds to step 904 for controlling the motor driving to close the sub-body 120 and then the control proceeds to step 906 to make a measurement of the motor driving current detected by the sensor 240 for a period of 30 msec repeatedly to therefrom generate a set of current code values corresponding to the measured values. The control then proceeds to step 908 to determine whether or not it has detected a signal of the closure sensor 238 indicating that the sub-body is fully closed, that is to say, when the closure sensor 238 detects the magnet 302.

In step 908, if the magnet 302 is detected, then the control unit 200 proceeds to step 910 to determine the variable M1 from a plurality of current code values measured before the sensor detection of the closure sensor 238. According to the current code values, there is a First highest current value>a Second highest current value>a Third highest current value>a Fourth highest current value >a Fifth highest current value, etc. If the Fourth or Fifth highest current value is taken for M1, there is a high possibility that too low of a value is taken for M1. If the First or Second highest current value is taken, there is a possibility that a higher value than THR in FIG. 6 is taken because the First or Second highest current value has more noise generated due to automatic movement of a motor. So, an appropriate value without noise has to be selected for M1. However, according to the embodiment of the present invention, when current is measured periodically for a period of 30 msec, it is found that the third highest current value is the best possible value of M1 because it is the highest current value among the measured values that has no noise due to automatic movement of a motor. Therefore, it is preferable for the value M1 to be selected from one of the highest three current code values, that is, the First to Third highest values, measured before the sensor detection of the closure sensor, advantageously, but not exclusively, the third highest value of the above three values. Such a selection could render considerable noise immunity upon determination of the best possible value of M1. FIG. 8 illustrates the highest current value M1 selected before the sensor detection of the opening and closure sensors. Further, it is possible to select a current value for M1 by averaging all measured values or averaging some selected values.

Following execution of step 910, the control proceeds to step 912 to periodically measure the motor driving current detected by the current sensor 240 for a period of 30 milliseconds (msec) to therefrom generate a corresponding code value and subsequently to step 914 to determine whether or not a predetermined time duration, for example, a few tens of milliseconds (msec) has elapsed after the sensor detection of the closure sensor 238. Accordingly, the control unit continues to enable the motor driving operation of the sub-body motor 234 during the few tens of milliseconds (msec) even after completion of the sensor detection. In step 914, if it is determined that the above-mentioned predetermined time duration has elapsed after the sensor detection, the control proceeds to a step 916 to disable the motor driving. Subsequently, the control proceeds to step 918 to determine second variable M2 from current code values measured after the sensor detection of the closure sensor 238, in which it is preferable for the value M2 to select one of the highest three current code values, that is to say, the first to third higher values, measured after the sensor detection of the closure sensor, advantageously, but not exclusively, the third highest value of the above three values. Such an election method could render considerable noise immunity upon determination of the best possible value of M2. FIG. 8 illustrates the highest current value M2 selected after the sensor detection of the opening and closure sensors.

Once the values M1 and M2 have been determined as described above, the control unit proceeds to step 920 to determine a current threshold value THR, wherein an intermediate value in between M1 and M2 is preferred to make the best possible current threshold value THR according to the present invention. According to experiments performed by the inventor of the present invention, the most preferred current threshold value THR can be obtained from the following formula:

$$THR = M2 - k(M2 - M1)$$

wherein variable k is a given constant value between $3/8$ to $2/3$. Although the value k may be subject to a small degree of deviation from the above range, a series of experiments made by the inventor have revealed that the most preferred value for k would be within this range from $3/8$ to $2/3$ as mentioned above, in particular, the k value of $3/8$ is the best possible threshold value THR suited to the present invention.

Thereafter, the control unit 200 proceeds to step 922 to thereby apply the current threshold value THR determined by step 920 as a current threshold value for a corresponding foldable mobile terminal according to the present invention.

As understood from the foregoing description, the present invention will not only achieve very effective automatic opening and/or closing operation of the sub-body folder in the foldable mobile communication terminal, but also an opening or closing position of the sub-body could be controlled in a more proper and precise manner as compared to the prior art method.

While the present invention has been shown and described with reference to preferred embodiments thereof, it will be understood by those skilled in the art that various changes and modifications in form and details may be made therein and equivalents may be substituted for elements thereof, without departing from the spirit and scope of the invention as defined by the appended claims.

What is claimed is:

1. A method for optimizing an automatic opening and closure control of a sub-body folder in a foldable mobile communication terminal having a main body, the sub-body foldably mounted on the main body, a sensor means for detecting a fully open or closed state of the sub-body with respect to the main body, a sub-body opening/closing drive unit including a motor, and a current sensor for detecting an amount of motor driving current applied to the drive motor, the method comprising the steps of:

measuring a first motor driving current detected by the current sensor during an opening or closing operation of the sub-body by the sub-body opening/closing drive unit, and a second motor driving current detected by the current sensor after detection by the sensor means of a fully opened or fully closed state of the sub-body; and determining an optimal current threshold value based on the first and second motor driving currents to be taken as a reference value for anticipating an operational state of the motor, and applying the current threshold value to the foldable mobile communication terminal.

2. A method for optimizing an automatic opening and closure control of a sub-body folder in a foldable mobile communication terminal having a main body, the sub-body foldably mounted on the main body, a sensor means for detecting a fully open or closed state of the sub-body with respect to the main body, and a sub-body opening/closing drive unit including a motor, the method comprising the steps of measuring a first motor driving current applied to the motor on an automatic opening or closing operation of the sub-body by the sub-body opening/closing drive unit upon receipt of an instruction for starting a self-diagnosis operation from a user;

if the sensor means detects either one of the fully open or closed positions of the sub-body, determining as a first current value a representative one of current values measured before detection by the sensor means;

measuring a second motor driving current applied to the motor on an automatic opening or closing operation of the sub-body by the sub-body opening/closing drive unit for a predetermined time duration after detection by the sensor means;

determining as a second current value a representative one of current values measured after detection by the sensor means; and determining an optimal current threshold value based on the first and second motor driving currents to be taken as a reference value for anticipating an operational state of the motor, on basis of the first and second current values, so as to thereby apply the current threshold value to the foldable mobile communication terminal.

3. The method as claimed in claim 2, wherein the current threshold value (THR) is determined by the following formula:

$$THR=M2-k(M2-M1)$$

wherein variable k is a given constant value between $3/8$ to $2/3$, M1 is the first current value and M2 is the second current value.

4. The method as claimed in claim 2, wherein the predetermined time duration after detection by the sensor means is in the range of 0 to 30 milliseconds.

5. The method as claimed in claim 2, wherein the representative one of current values measured is the highest one of the current values measured.

6. The method as claimed in claim 2, wherein the representative one of current values measured is the highest one of the current values measured which has no noise generated by the motor.

7. A method for optimizing an automatic opening and closure control of a sub-body folder in a foldable mobile communication terminal having a main body, the sub-body foldably mounted on the main body, a sensor means for detecting a fully open or closed state of the sub-body with respect to the main body, and a sub-body opening/closing drive unit including therein a motor, the method comprising the steps of:

measuring a first motor driving current applied to the motor on an automatic opening or closing operation of the sub-body by the sub-body opening/closing drive unit upon receipt of an instruction for starting a self-diagnosis operation from a user;

if the sensor means detects either one of the filly open or closed positions of the sub-body, determining as a first current value either one of the highest three or more values of the current amounts measured before detection by the sensor means;

measuring a second motor driving current applied to the motor on an automatic opening or closing operation of the sub-body by the sub-body opening/closing drive unit for a predetermined time duration after detection by the sensor means;

determining as a second current value either one of the highest three or more values of the current amounts measured after detection by the sensor means; and determining an optimal current threshold value as an intermediate value between the first and second current values, said current threshold value being usable as a reference value for anticipating an operational state of the motor.

8. The method as claimed in claim 5, wherein said either one of the highest three or more values of the current amounts measured before and after detection by the sensor means is preferably of the third highest value.

9. The method as claimed in claim 5, wherein the current threshold value (THR) is determined by the following formula:

$$THR=M2-k(M2-M1)$$

wherein variable k is a given constant value between $3/8$ to $2/3$, M1 is the first current value and M2 is the second current value.

10. A method for optimizing an automatic opening and closure control of a sub-body folder in a foldable mobile communication terminal having a main body, the sub-body foldably mounted on the main body, a sensor means for detecting a fully open or closed state of the sub-body with respect to the main body, and a sub-body opening/closing drive unit including therein a motor, the method comprising the steps of measuring a first motor driving current applied to the motor on an automatic opening or closing operation of the sub-body by the sub-body opening/closing drive unit upon receipt of an instruction for starting a self-diagnosis operation from a user;

if the sensor means detects either one of the fully open or closed positions of the sub-body, determining as a first current value one of the current amounts measured which has no noise generated by the motor before detection by the sensor means;

measuring a second motor driving current applied to the motor on an automatic opening or closing operation of the sub-body by the sub-body opening/closing drive unit for a predetermined time duration after detection by the sensor means;

determining as a second current value one of the current amounts measured which has no noise generated by the motor after detection by the sensor means; and determining an optimal current threshold value as an intermediate value between the first and second current values, said current threshold value being usable as a reference value for anticipating an operational state of the motor.

11. The method as claimed in claim 10, wherein the current threshold value (THR) is determined by the following formula:

$$THR=M2-k(M2-M1)$$

wherein variable k is a given constant value between $3/8$ to $2/3$, M1 is the first current value and M2 is the second current value.

* * * * *